United States Patent
Wang et al.

(10) Patent No.: US 10,826,595 B2
(45) Date of Patent: Nov. 3, 2020

(54) GNSS-ASSISTED WIRELESS COMMUNICATION

(71) Applicant: AERO5G, INC., Poway, CA (US)

(72) Inventors: Jun Wang, Poway, CA (US); Bin Liu, San Diego, CA (US)

(73) Assignee: AERO5G, INC., Poway, CA (US)

( * ) Notice: Subject to any disclaimer, the term of this patent is extended or adjusted under 35 U.S.C. 154(b) by 42 days.

(21) Appl. No.: 16/212,593

(22) Filed: Dec. 6, 2018

(65) Prior Publication Data

US 2020/0186236 A1    Jun. 11, 2020

(51) Int. Cl.
| | |
|---|---|
| H04B 7/185 | (2006.01) |
| H04W 52/24 | (2009.01) |
| G01S 19/25 | (2010.01) |
| G01S 19/26 | (2010.01) |
| H04W 16/28 | (2009.01) |
| H04W 36/08 | (2009.01) |
| H04W 24/10 | (2009.01) |

(52) U.S. Cl.
CPC ........ *H04B 7/18506* (2013.01); *G01S 19/254* (2013.01); *G01S 19/26* (2013.01); *H04W 16/28* (2013.01); *H04W 24/10* (2013.01); *H04W 36/08* (2013.01); *H04W 52/242* (2013.01)

(58) Field of Classification Search
None
See application file for complete search history.

(56) References Cited

U.S. PATENT DOCUMENTS

| | | | |
|---|---|---|---|
| 6,363,261 B1 | 3/2002 | Raghavan | |
| 2004/0104841 A1* | 6/2004 | Syrjarinne | G01S 5/0252 342/357.25 |
| 2012/0257519 A1* | 10/2012 | Frank | H04L 5/0035 370/252 |
| 2014/0092877 A1* | 4/2014 | Kazmi | H04W 88/06 370/336 |
| 2014/0321304 A1 | 10/2014 | Yu et al. | |
| 2015/0057925 A1* | 2/2015 | Schreiber | G01S 19/258 701/491 |
| 2016/0112940 A1* | 4/2016 | Chambers | G01S 19/42 455/435.3 |
| 2016/0173999 A1* | 6/2016 | Ungstrup | H04B 1/3827 381/315 |
| 2017/0127332 A1 | 5/2017 | Axmon et al. | |
| 2017/0171792 A1 | 6/2017 | Axmon et al. | |
| 2017/0324463 A1 | 11/2017 | Jalali | |

(Continued)

*Primary Examiner* — Eunsook Choi
(74) *Attorney, Agent, or Firm* — Coastal Patent Law Group, P.C.

(57) ABSTRACT

The disclosure concerns systems and methods for providing fifth generation or later (5G+) wireless communication, for in-flight and other applications, by way of integrating global navigation satellite system (GNSS) data among other features and aspects. In various embodiments, systems and methods are disclosed embodying one or more of: GNSS-assisted Doppler estimation and tracking; GNSS-assisted cell acquisition, measurement, and handover target cell selection; GNSS-assisted timing advance estimation and tracking; GNSS-assisted power control; and/or GNSS-assisted beam identification and tracking. Each of these, when considered individually or in any combination, provides GNSS-assisted wireless communication.

9 Claims, 4 Drawing Sheets

(56) References Cited

U.S. PATENT DOCUMENTS

| | | |
|---|---|---|
| 2018/0336789 A1 | 11/2018 | Damnjanovic et al. |
| 2019/0182730 A1* | 6/2019 | Yeh ..................... H04W 36/32 |
| 2020/0003894 A1* | 1/2020 | Giancristofaro ........ G01S 13/90 |
| 2020/0007384 A1* | 1/2020 | Mueck ................ H04L 43/0817 |

* cited by examiner

GNSS-ASSISTED WIRELESS COMMUNICATION

BACKGROUND

Field of the Invention

The invention relates to systems and methods for providing wireless communication between a cellular ground network and a moving sub-network, such as aircraft, trains, balloons, drones, and the like; and more particularly, to such systems and methods making use of global navigation satellite system (GNSS)-integration to provide fifth generation or later wireless communication (5G+) between a cellular ground network and a moving sub-network.

Description of the Related Art

Wireless data communication has become ubiquitous with modern data-driven lifestyles and the advent of mobile connected devices. Related to this, aircraft travelers are increasingly demanding high-speed data connectivity for business and personal applications. There continues to be a significant need for high-speed data connectivity aboard passenger and other flights. However, providing in-flight communication services comes with several challenges.

Two possible solutions have been proposed for providing in-flight communication.

First, aircraft can be serviced by base stations located on a network of satellites. Ku band and Ka band satellite solutions for creating the actual link between digital services and the aircraft may be efficient for long-haul flights on intercontinental routes over the oceans, at least in terms of coverage. However, for short- and medium-haul continental flights, a satellite-based solution is relatively costly; the equipment is heavy, bulky and expensive, and latency is high in regions with heavy air traffic. Ka band and Ku band satellite antennas are difficult to install on continental aircraft, requiring significant investments in the aircraft infrastructure. Additionally, Ka band satellite solutions entail a large transmission path from the aircraft to their geostationary orbits 36,000 kilometers above the Earth—a general hindrance for any delay-critical service.

Second, aircraft can be serviced by base stations of a cellular wireless network located on the ground; i.e. ground base stations. While the concept of in-flight communication using ground base stations (3G NBs and 4G eNBs) has been considered for 3G and 4G communications, there are several problems concerning implementation of this architecture with respect to 5G and using 5G ground base stations (gNBs). For example, Doppler speed and latency issues need to be solved in order to achieve reliable 5G connectivity, for example, over in-flight networks.

Flight user equipment (UE) is distinct from traditional ground user equipment (UE) at least with respect to: (i) the speed of the aircraft, which is much faster than typical Ground UE, hence a much higher Doppler speed; (ii) the aircraft has a more specific flight path compared to Ground UE; and (iii) the aircraft is always connected to the global navigation satellite system (GNSS).

SUMMARY

The disclosure concerns systems and methods for providing fifth generation (5G) wireless communication, for in-flight and other applications, by way of integrating global navigation satellite system (GNSS) data among other features and aspects.

In some embodiments is disclosed systems and methods for GNSS-assisted Doppler estimation and tracking.

In another embodiment is disclosed GNSS-assisted cell acquisition, measurement, and handover target cell selection.

In another embodiment is disclosed GNSS-assisted timing advance estimation and tracking in initial access procedures and subsequent data transmission.

In another embodiment is disclosed GNSS-assisted power control.

In yet another embodiment is disclosed GNSS-assisted beam identification, beam tracking, and beam management.

One or more of these and other embodiments can be combined to provide systems and methods for providing wireless communication between a cellular ground network and a moving sub-network.

Each of these, and other embodiments as-disclosed herein, when considered individually or in any combination, provides GNSS-assisted wireless communication. The GNSS-assisted wireless communication is believed to be the first of its kind which is capable of offering in-flight 5G+ wireless communication through a cellular ground network.

BRIEF DESCRIPTION OF THE DRAWINGS

These and other features and benefits will be appreciated by one with skill in the art upon a thorough review of the appended detailed descriptions and drawings, wherein.

DETAILED DESCRIPTION OF EMBODIMENTS

In the following description, for purposes of explanation and not limitation, details and descriptions are set forth in order to provide a thorough understanding of the embodiments of the invention. However, it will be apparent to those skilled in the art that the present invention may be practiced in other embodiments, including certain variations or alternative combinations that depart from these details and descriptions. The examples disclosed herein are intended to enable those with skill in the art to practice the invention, but such examples shall not reasonably be construed as limiting the spirit and scope of the invention as-claimed.

Figure 1:
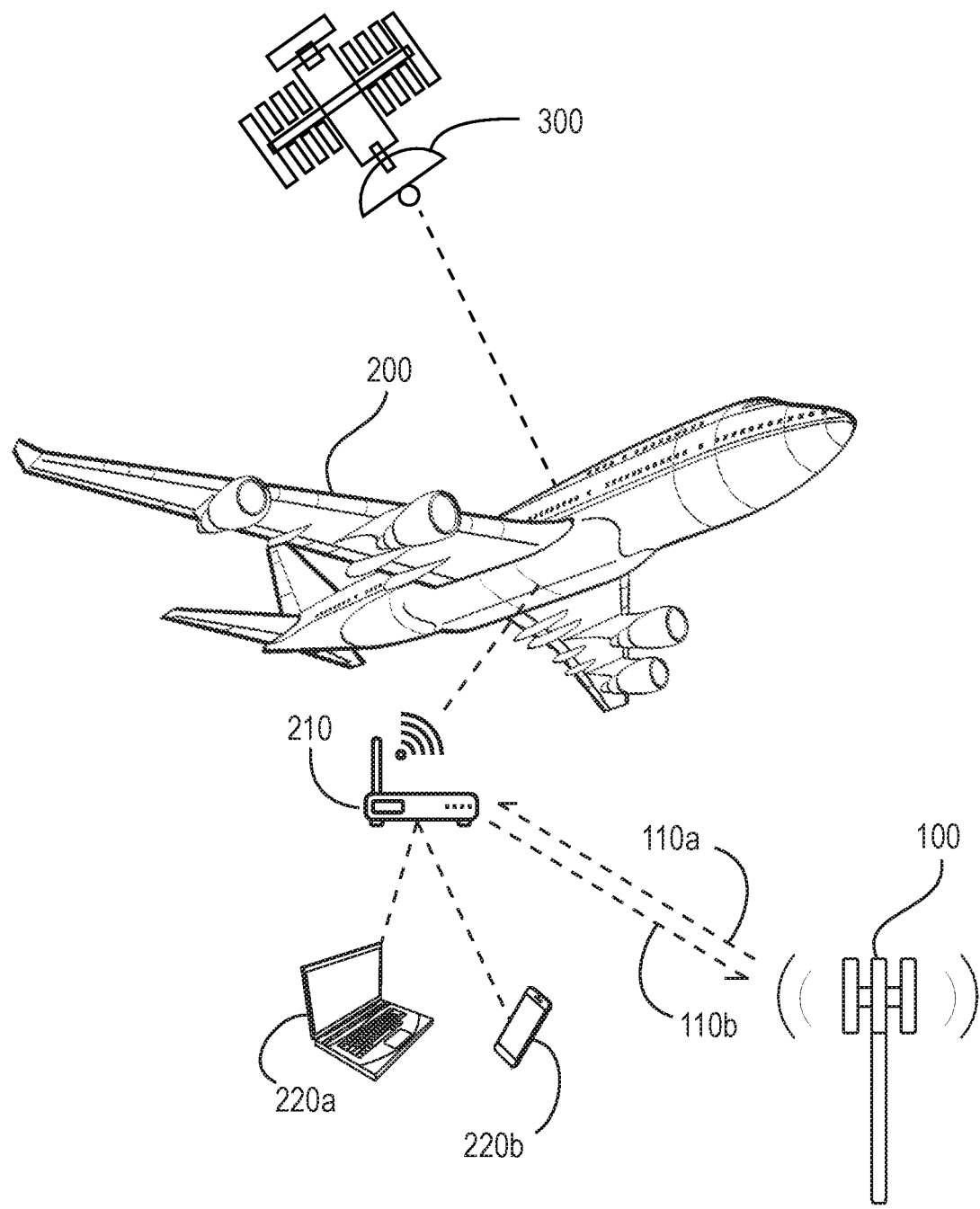
FIG. 1 shows a network architecture for providing GNSS-assisted wireless communication through a cellular ground network.

Now turning to the drawings, FIG. 1 shows a network architecture for providing GNSS-assisted wireless communication through a cellular ground network.

For purposes herein, the aircraft 200 contains flight user equipment 210 (herein "Flight UE" or "FUE"), which is generally integrated with, or coupled to, at least one wireless access point onboard the aircraft. Through the Flight UE, the wireless access point(s) service individual devices or user equipment ("UE"), such as laptops 220a or cell phones 220b, on the aircraft.

The Flight UE is connected to a ground-based cellular network comprising a plurality of ground base stations, such as next generation nodeB (gNBs) 100. Each gNB located along the flight path (route of the aircraft) is configured to communicate with the Flight UE via a forward link 110a and a reverse link 110b. As the aircraft continues along the flight path, the connection executes a handover from a connected gNB to a subsequent gNB.

As will be further described herein, the Flight UE is configured to communicated with satellites 300 of the global navigation satellite system (GNSS) to obtain navigation data (ex: position, vector-direction and velocity of aircraft and other GNSS-connected moving objects), which navigation data is useful to compensate wireless signal parameters for providing the wireless communication to moving sub-networks.

Ground-based user equipment ("Ground UE"), such as cell phones, automobiles, and other connected devices located on terrestrial ground may be further connected to the gNBs on the ground network (not shown). In this regard, the same gNBs of the cellular ground network are generally capable of servicing both the Ground UE and the Flight UE. The Ground UE often does not require signal parameter compensation as described with respect to the moving sub-networks, for example, if the Ground UE is traveling less than 100 mph.

However, as described above, with the much higher travel speed of the Flight UE, the Doppler speed is significant and must be considered in order to achieve useful connectivity of the Flight UE on the ground-based cellular network. For example, at the 4 GHz band, the Doppler speed with an aircraft traveling at 1200 km/h is about 4.4 KHz. However, at 28 GHz band and the same aircraft velocity, the Doppler speed is about 30.8 KHz.

A relatively high Doppler speed will negatively impact system performance. For example, the channel does not remain unchanged within an OFDM symbol, which will result in inter-carrier interference (ICI). In addition, the channel will change from one OFDM symbol to another. This can introduce channel estimation loss for data demodulation. The fast channel variation is also not friendly for further time domain filtering to reduce the channel estimation error, which results into reduced channel estimation quality. Moreover, the current tracking reference signal (TRS) design in new radio, i.e. 5G, can only handle Doppler speed up to +/−3.75 KHz in Frequency Range 1 (FR1, e.g., sub-6 GHz band) and +/−15 KHz in Frequency Range 2 (FR2, e.g., mmW band).

Therefore, the Doppler speed must be not only considered but adequately compensated in order to achieve useful connectivity between the Flight UE and the ground-based network.

Embodiments herein disclose systems and methods for providing Global Navigation Satellite System (GNSS)-assisted wireless communication between cellular ground networks and moving sub-networks.

Example 1: GNSS-Assisted Doppler Pre-Compensation

In one embodiment, the Doppler speed problem described above is solved by integrating into a wireless communication system, or related method, certain global navigation satellite system (GNSS) data, and data-derivatives which can be derived from the GNSS data, collectively "navigation data", in order to compensate for the Doppler shift.

In a first embodiment, the Flight UE is connected to the GNSS and obtains velocity data associated with the aircraft. The Flight UE may optionally receive other aircraft-related navigation data from the GNSS, including but not limited to: elevation, direction, and other environmental data. The navigation data is used to estimate Doppler shift via an algorithm resident in software and associated with the Flight UE.

With respect to Flight UE receive (Rx) signaling, the Flight UE is configured to compensate the received signal (signal received from gNBs) according to the estimated Doppler shift ("DS-Rx"), and proceeds to the rest of Rx signal processing in accordance with known signal processing methods. Due to Doppler shift, the received signal on the Flight UE can be modeled as:

$$y(t)=x(t)e^{j2\pi(\Delta ft)}+n(t),$$

where $\Delta f$ is the Doppler shift and n(t) is noise.

Therefore, the Flight UE can compensate the received signal as:

$$y(t)e^{-j2\pi(\Delta ft)}$$

to reduce the Doppler impact.

With respect to Flight UE transmit (Tx) signaling, the Flight UE is configured to compensate the transmitted signal according to the estimated Doppler shift ("DS-Tx"), and proceeds to the rest of Tx signal processing in accordance with known signal processing methods. Similar to above, the signal transmitted form the Flight UE can be modeled as:

$$y(t)=x(t)e^{j2\pi(\Delta ft)}+n(t),$$

where $\Delta f$ is the Doppler shift and n(t) is noise.

Therefore, the Flight UE can pre-compensate the transmit signal as:

$$x(t)e^{-j2\pi(\Delta ft)}$$

to reduce Doppler impact.

In this regard, the gNB of the cellular ground network will receive the signal transmitted from the Flight UE, the signal being compensated for Doppler shift. The compensation thus adapting the signal for 5G communication; i.e. the effective shift will be within the acceptable range for 5G.

In the aforementioned first embodiment, the Flight UE transmit and receive function is agnostic to the gNB since all Doppler shift compensation algorithms are resident and implemented at the Flight UE. In this regard, the gNB is not required to know the aircraft velocity (Flight UE velocity) and location; i.e. navigation data. However, in an alternative embodiment, the Flight UE may communicate the aircraft speed and location (navigation data) to or more gNBs of the ground network, and the ground network can compensate signals according to the navigation data.

Thus, in a second embodiment, the ground network is configured to process Flight UE communication signals at the network side in order to compensate for Doppler shift. To this end, the network side will require navigation data, including the aircraft velocity and location, which can be shared from the Flight UE or obtained from other sources, for example, it may be obtained directly from the GNSS network or through a network server having the required information.

With aircraft velocity and location data, the server side of the ground network can compensate for the frequency offset based on the indicated aircraft speed and location.

In this second embodiment, the signal transmitted from the gNB to the Flight UE is conditioned with Doppler pre-compensation such that the Flight UE is not required to compensate during receive processing. Similarly, the Flight UE can be configured to transmit without Doppler compensation, and the gNB ground network can condition the signal received at the gNB based on the communicated aircraft velocity and location.

In either the first embodiment wherein communication signals are conditioned for Doppler shift at the Flight UE, or in the second embodiment wherein communication signals are conditioned for Doppler shift at the network side, the residual Doppler which may go uncompensated can be handled by other 5G signals for Ground UE, such as tracking reference signal (TRS), sync signal broadcast (SSB), and the like.

Accordingly, disclosed is a solution to the Doppler shift problem for providing fifth generation or later (5G+) wireless communication between in-flight and ground equipment which comprises compensating one or more of: Flight UE Rx signals, Flight UE Tx signals, gNB Rx signals, and gNB Tx signals with an estimated Doppler shift buffer based on navigation data received from GNSS, such as aircraft location relative to gNB and aircraft velocity.

Example 2: GNSS-Assisted Cell Acquisition, Measurement and Handover Target Cell Selection In another embodiment, systems and methods are described for providing GNSS-assisted cell acquisition, measurement and handover target selection.

In contrast to conventional Ground UE, the Flight UE onboard the aircraft typically has a specific pre-planned route according to the aircraft flight plan which can be utilized for enhanced cell acquisition, handover and measurements.

In one embodiment, the Flight UE can be preconfigured to store information related to the cell distribution within a connected network and/or a subset of the cell distribution located along or near the specific flight path of the aircraft according to the flight plan. Alternatively, the ground network can be configured to provide to the Flight UE certain information associated with the cell distribution or a portion thereof, for example, in a communication uploaded from the ground network to the Flight UE.

Additionally, the Flight UE, cellular ground network, or combination thereof, may be configured to obtain prior to, and during flight, the location of the aircraft via GNSS or other means.

Using the flight route data, and/or location data obtained from GNSS, the Flight UE can be configured to determine a subset of cells, i.e. a limited number of candidate cells, to perform cell search, as opposed to hundreds (or thousands) of 5G cells across the entire network. Accordingly, the cell acquisition performance and complexity can be significantly improved based on the narrowed search of sub-set candidate cells, as opposed to all cells in the network.

Figure 2:
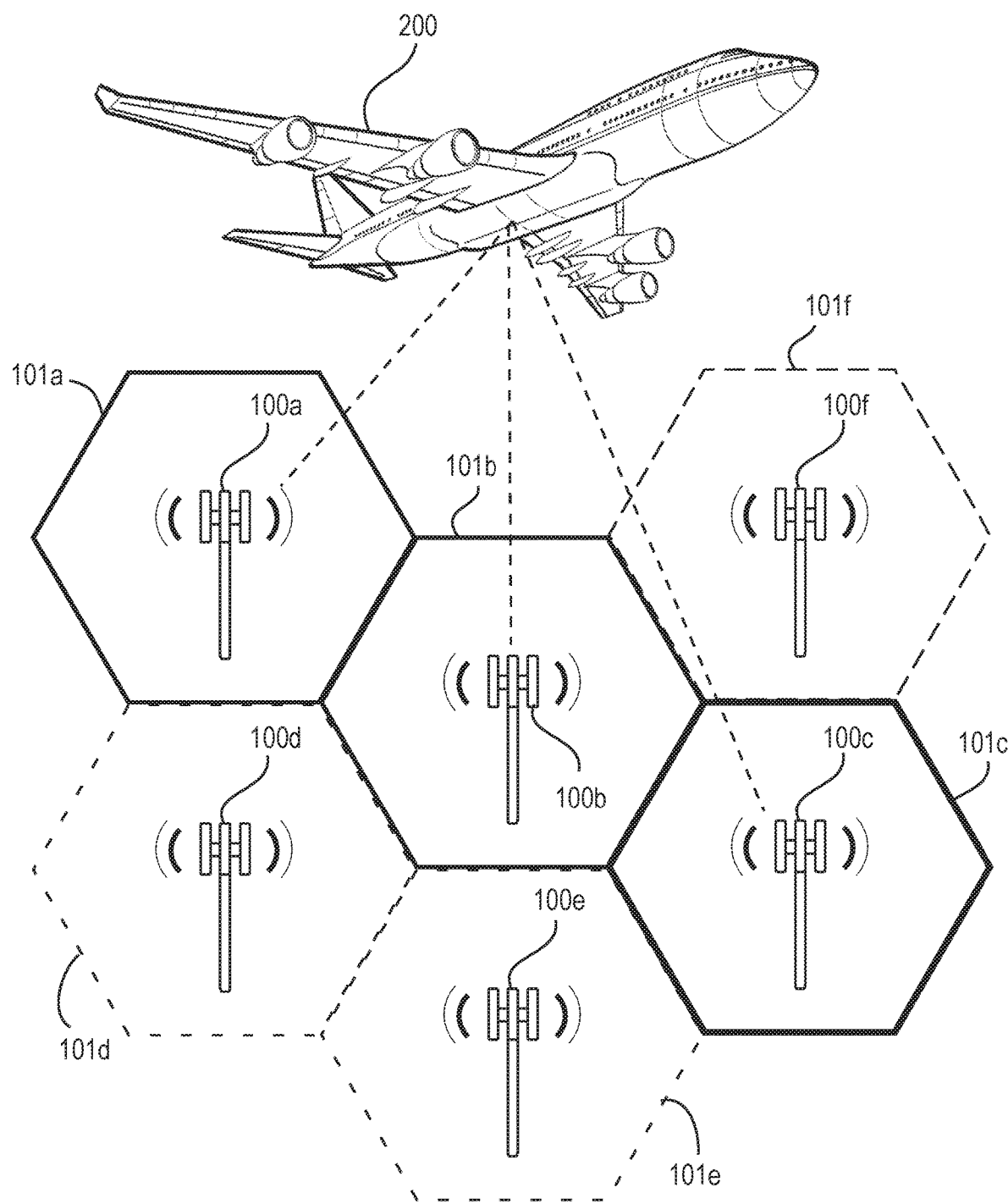
FIG. 2 illustrates GNSS-assisted cell acquisition in accordance with an embodiment herein.

FIG. 2 shows an aircraft 200 with Flight UE configured to use flight route data for limiting the number of cells in the network (i.e. those along the flight route) for performing cell searching, cell acquisition, measurements, and handover. Of all cells, FIG. 2 illustrates the candidate cells 101a; 101b; 101c for performing cell searching, cell acquisition, measurements, and handover versus non-candidate cells 101d; 101e; 101f (shown in broken lines). All cells are shown with a respective gNB 100a-100f, respectively. Note that FIG. 2 is intended to represent the concept only, and is not drawn to scale.

In some embodiments, the Flight UE can be configured to communicate the flight route data associated with the aircraft to the ground network (gNBs). A cell acquisition plan may be prepared by the cellular ground network and communicated to the Flight UE. Alternatively, or additionally, as the aircraft travels along its flight path, adjustments to the cell acquisition plan can be made based on the aircraft location data or other navigation data obtained from GNSS, either by the Flight UE or by the ground network. Accordingly, using the navigation data and cell distribution data, the ground network can be configured to determine the candidate cells for the Flight UE to perform measurements, and this information can be communicated to the Flight UE from the ground network.

In these embodiments, the Flight UE is required to perform measurements only on the limited subset of candidate cells. Thus, the measurement complexity as well as measurement report overhead can also be reduced.

From its navigation data and the cell distribution data, the Flight UE can determine the target cell for handover and can request the network to have early handover preparation. Alternatively, the network can determine the target cell for early handover preparation based on the Flight UE navigation data and the flight path. In either variation, the early handover preparation ensures a seamless handover form one cell to the next and allows the target cell to schedule the upcoming Flight UE with improved resource preparation.

In some embodiments, Flight UE navigation data, such as location information and context information, can be exchanged between gNBs beforehand.

In some embodiments, the Flight UE onboard the aircraft can determine, based on the aircraft location data obtained from GNSS, that the Flight UE is within the vicinity of Cells 101a thru 101c (FIG. 2). Thus, the Flight UE is required only to search for Cells 100a thru 100c, as opposed to all cells in the network.

Similarly, in some embodiments, the Flight UE onboard the aircraft can determine, based on the aircraft location data obtained from GNSS or otherwise, that the Flight UE is within the vicinity of Cells 100a thru 100c (FIG. 2), and thus is required to perform measurements, and report the measurements, for Cells 100a thru 100c, as opposed to the entire network.

Moreover, in some embodiments, the Flight UE onboard the aircraft can determine, based on the aircraft location data obtained from GNSS and the cell distribution data, that the Flight UE is moving from Cell 100a toward Cell 100b (FIG. 2). The Flight UE can then request early preparation for handover between Cell 100a and Cell 100b.

Alternatively, the Flight UE can indicate the aircraft location and flight path to Cell 100a, and the ground network can then request Cell 100b (FIG. 2) to have early preparation for the Flight UE.

GNSS-assisted cell acquisition, measurement, and handover as described above provides a much faster and more efficient protocol for achieving network connectivity along the flight path.

Example 3: GNSS-Assisted Timing Advance Estimate

In another embodiment, systems and methods are described for providing a GNSS-assisted timing advance estimate for use with servicing wireless communication about moving sub-networks (such as in-flight).

For initial access, UE is required to send preamble for gNB to estimate timing advance (TA) to ensure the received signals from all UEs arriving within cyclic prefix (CP) avoid inter-symbol interference (ISI) and inter-carrier interference (ICI).

The actual TA depends on the distance between UE and gNB, and it must be sufficient to cover the round-trip delay between UE and gNB. For example, when UE is 10 km away from gNB, the corresponding TA might be 67 µs;

however, with 50 km distance the TA might be 333 µs. While such large TA can be supported with preamble format in FR1, it cannot be supported with preamble format in FR2.

In connected state, the gNB may also issue a TA command to align the UE transmit timing when needed. However, current TA command in connected state can only support limited TA range.

Accordingly, it is proposed in an embodiment herein that the Flight UE can obtain its location and distance from gNB, and calculate the coarse TA accordingly. Location of the gNB is fixed and may be stored as network data. However, the aircraft location is constantly changing, and is preferred to be obtained from GNSS. The Flight UE can obtain (ex: download) and use the gNB location data and the GNSS-obtained aircraft location data to determine the distance between the aircraft and the gNB for any time (t). Given the aircraft navigation data (ex: direction and velocity), the Flight UE can predict future distance(s) between the Flight UE and the gNB. This information can be stored in memory, and may be updated from time to time, or may be obtained only when required.

In a preferred embodiment, the Flight UE sends the uplink signal with the timing advance based on the estimated coarse TA. For example, assuming the Flight UE needs to send signal x(t), with TA pre-compensation from GNSS ("TA_1"), the Flight UE sends x(t+TA_1) instead. The additional TA component will be covered by random access or TA command. The gNB detects the additional TA component in excess of the Flight UE adjusted timing, and indicates the additional TA component ("TA_2") to the Flight UE accordingly.

The actual TA for UE to transmit signal is TA_1+TA_2 and UE advances its transmission by TA_1+TA_2.

During the initial access, the TA issued by the gNB cannot be negative, hence the TA pre-compensation based on GNSS should be more conservative to ensure the uplink signal with TA_1 does not result into negative TA_2. This can be achieved by effective back off on TA_1. Alternatively, in the connected state, the TA_2 issued by the gNB can be either positive or negative, in this case, there is no additional back off required on TA_1.

Example 4: GNSS-Assisted Power Control

In another embodiment, systems and methods are described which make use of GNSS-assisted power control.

The uplink power control is essential in an orthogonal frequency-division multiple access (OFDMA) system where the difference of the received power from multiple UEs must be controlled within a reasonable range to avoid adjacent carrier interference.

The power control is a function of path loss and/or data rate. When the UE is closer to a base station, it may transmit with a lower power compared to a UE located relatively far from the base station. Additionally, when the UE needs to support a high data rate, it may transmit with a higher power compared to the UE with low data rate.

Due to the relatively low speed of ground UE, the open loop power control does not adapt very fast. On the other hand, due to the much higher speed of the Flight UE, the path loss can change very dynamically.

In an embodiment, the Flight UE is configured to estimate its path loss to gNB based on its location to gNB as-obtained from the GNSS, and the Flight UE can be configured to update its open loop power control. The additional closed loop power control can be on top of the updated open loop based on GNSS-assisted path loss measurement. In this regard, the closed loop power control does not require a very large dynamic range and is not required to be very fast.

With the pre-determined flight route (flight route data) and the GNSS-obtained position (navigation data), the gNB can also estimate the path loss of the Flight UE and obtain the open loop power control parameter.

If the power control parameters between UE and gNB are not consistent within a range, for example, Flight UE transmits with higher power than the path loss requirement, the gNB can choose to schedule less time or frequency resources to flight UE to minimize its impact to the overall system capacity.

Example 5: GNSS-Assisted Beam Prediction and Management

In another embodiment, systems and methods are described embodying GNSS-assisted beam prediction for directing antenna signals.

Narrow beam transmission is one aspect for successful implementation of 5G wireless communication.

In one example, multiple antennas are combined coherently to form narrow beams to serve UE with better penetration and high data rate. In another example, a single beam steering antenna can be similarly implemented to achieve the same or similar result.

Regardless of the beam forming antenna system used, the narrow beam transmission relies on beam management where the Flight UE and gNB are required to be in sync on the beams to be used. When the beam is out of sync between gNB and UE, significant degradation is experienced.

Figure 3:
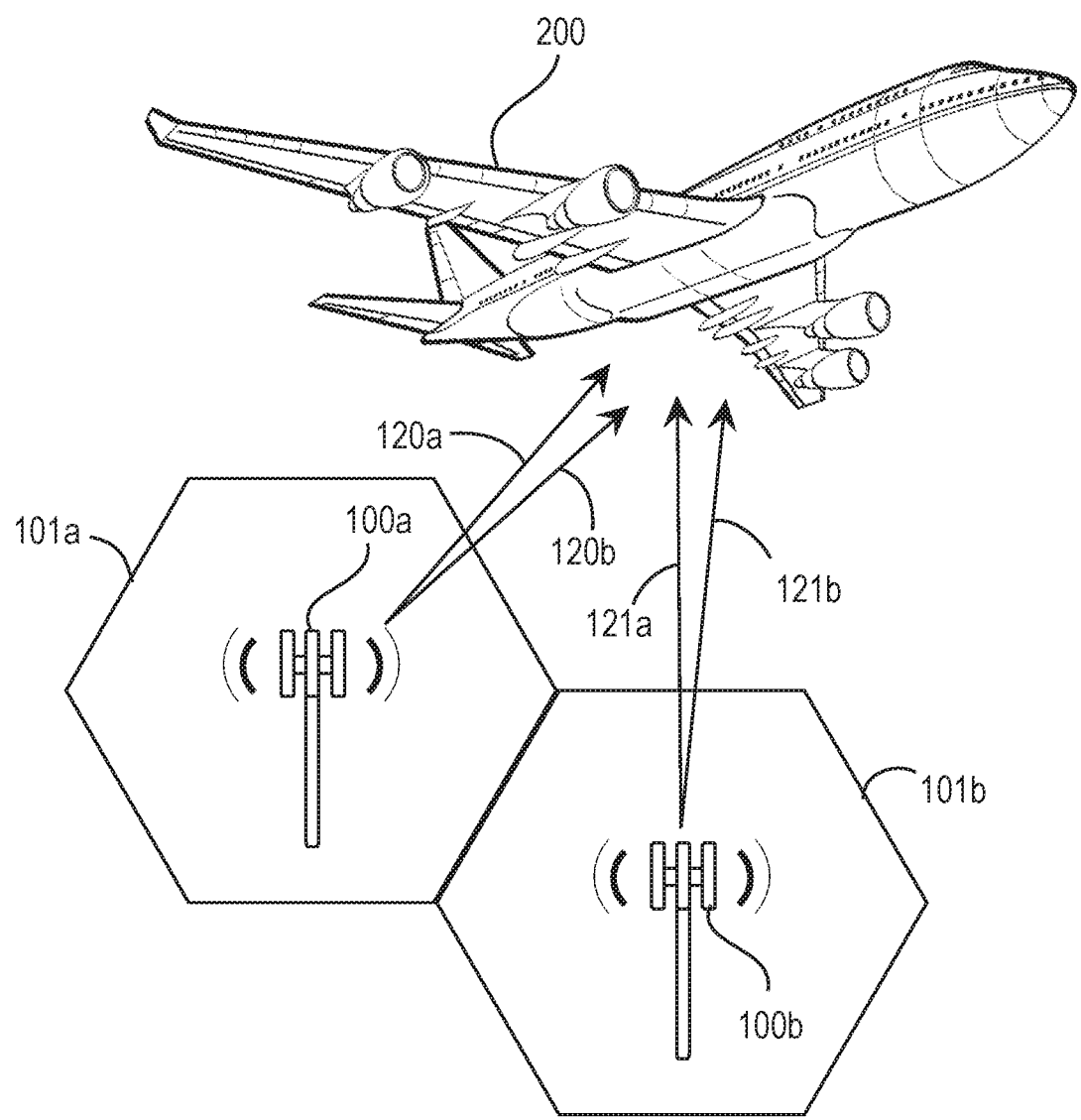
FIG. 3 illustrates GNSS-assisted beam prediction and management in accordance with an embodiment herein.

In the embodiment as shown in FIG. 3, GNSS-assisted beam prediction and management is implemented to ensure communication efficiency.

For example, the network can be configured to obtain and store the beam information based on the flight route. Based on the Flight UE location data, the cellular ground network 100*a*; 100*b* of cells 101*a*; 101*b* can predict the Tx/Rx beams 120(*a-b*); 121(*a-b*) to be used for Flight UE communication, for example, on the aircraft 200.

Alternatively, based on the Flight UE location data, the Flight UE can be configured to use the predicted Tx/Rx beams to communicate with a network gNB. This procedure can be applicable to transmission/reception in both connected state and initial access. For example, during initial RACH procedure, once the FUE reports its UE ID (e.g., IMSI, RNTI), the gNB can use the beam corresponding to the FUE for subsequent transmission/reception (e.g., MSG4, See FIG. 4).

Example 6. Overall System Procedures

Figure 4:
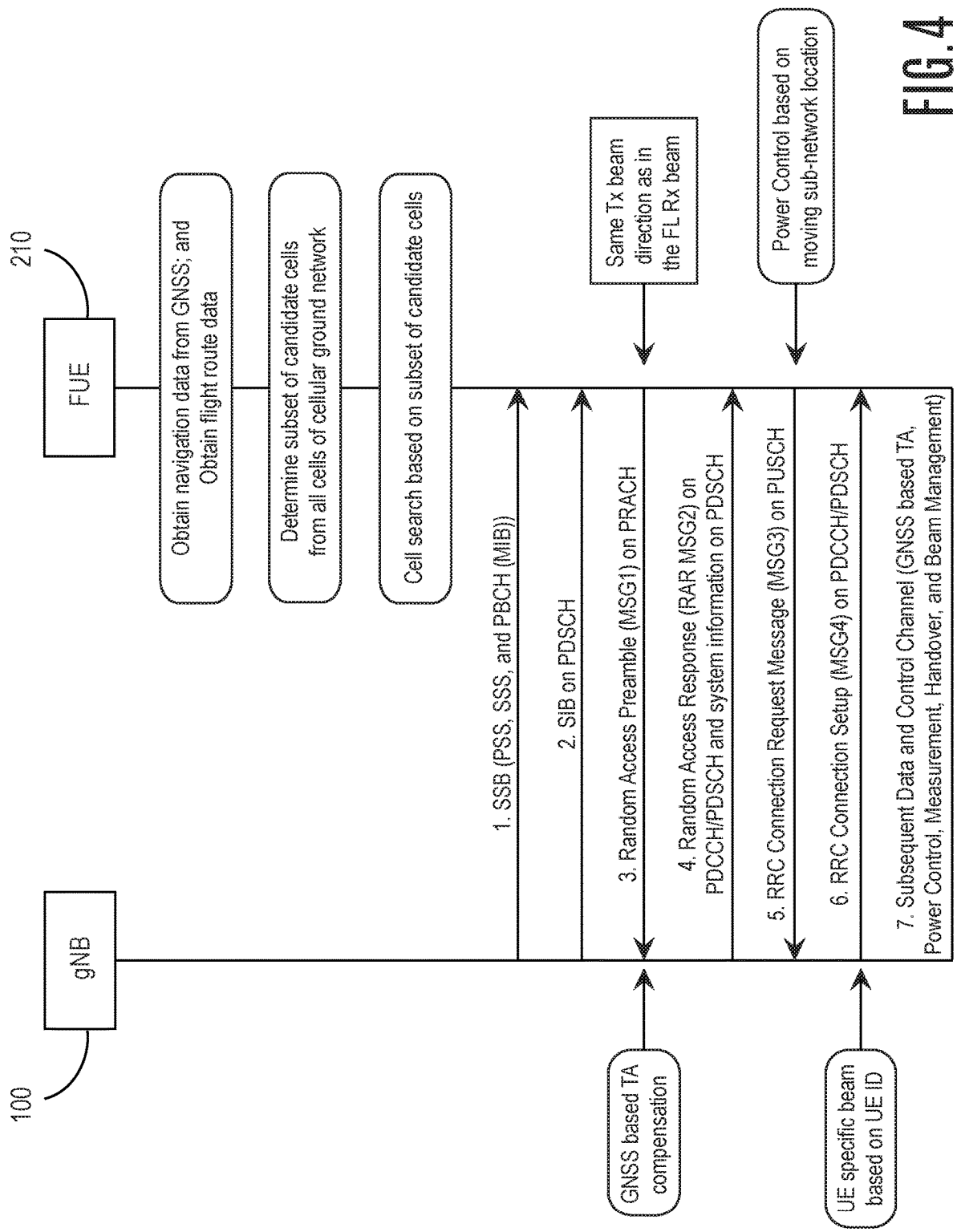
FIG. 4 illustrates signaling procedures with GNSS assistance in accordance with various embodiments herein.

Ain accordance with FIG. 4, the overall system procedures can be summarized as shown.

In a general embodiment, the cellular ground network is represented by a base station gNB 100, and the moving sub-network is represented by FUE 210.

The FUE is configured to obtain navigation data from GNSS, and may be further configured to obtain flight route data.

The FUE uses the navigation data and flight route data to determine a subset of candidate cells from all cells of the cellular ground network. Alternatively, the candidate cells can be uploaded to the FUE or recalled from memory.

The FUE performs cell search based on the subset of candidate cells (as opposed to all cells of the network).

Step 1: the gNB sends a synchronization signal and physical broadcast channel block (SSB) containing primary and secondary synchronization signals (PSS; SSS, respectively) and master information block (MIB) on the physical broadcast channel (PBCH).

Step 2: the gNB sends system information block (SIB) that defines the scheduling of other system information blocks and contains information required for initial access on the physical downlink shared channel (PDSCH).

Step 3: the FUE sends random access preambles (MSG1) on physical random-access channel (PRACH) using the same Tx beam direction as in the forward link received beam and using GNSS-based TA compensation.

Step 4: upon receiving MSG1, the gNB transmit two physical data: (i) physical downlink control channel (PDCCH) masked with radio access-radio network temporary identifier (RA-RNTI), which carries downlink control information (DCI) that is required to decode the PDSCH; and (ii) PDSCH, the MAC Data carrying random access response message (RAR or MSG2) and other information.

Step 5: upon successfully decoding RAR, the FUE transmits radio resource control (RRC) connection request (MSG3) on physical uplink shared channel (PUSCH) using the radio resource allocated by reverse link grant specified by RAR and using power control parameters based on its location together with power control command indicated in RAR.

Step 6: the gNB sends RRC connection setup message on PDSCH and control information on PDCCH required for decoding the PDSCH. The gNB uses UE-specific beam based on UE ID (international mobile subscriber identity (IMSI) or radio network temporary identifier (RNTI)) received from Step 5.

Step 7: the FUE is in a connected state. Subsequent data and control channel use GNSS-based timing advance (TA), power control, measurement, handover, and beam management.

GNSS-Assisted Wireless Communication

Thus, in accordance with the above embodiments, a method is disclosed for providing wireless communication between a cellular ground network and a moving sub-network, the method comprising: obtaining navigation data from the global navigation satellite system (GNSS), said navigation data comprising information associated with at least one of: position, vector-direction and velocity of the moving sub-network; and compensating one or more signal parameters for transmission, reception or a combination thereof based on the navigation data.

In some embodiments, the moving sub-network is housed on an aircraft.

In some embodiments, the method may further include: determining an estimated Doppler-shift component for a wireless signal based on the navigation data; and compensating a receive or transmit signal with the estimated Doppler-shift component.

In some embodiments, the method may further include: with flight user equipment of the moving sub-network, compensating received signals as $y(t) \, e^{j2\Pi(\Delta ft)}$ to reduce the Doppler impact, wherein $\Delta f$ is the estimated Doppler-shift component; wherein the compensating is implemented by the flight user equipment of the moving sub-network.

In some embodiments, the method may further include: with flight user equipment of the moving sub-network, pre-compensating transmitted signals as $x(t) \, e^{-j2\Pi(\Delta ft)}$ to reduce the Doppler impact, wherein $\Delta f$ is the estimated Doppler-shift component; wherein the pre-compensating is implemented by the flight user equipment of the moving sub-network.

In some embodiments, the method may further include: with flight user equipment of the moving sub-network, communicating at least a portion of the navigation data to a gNB of the cellular ground network, said at least a portion of the navigation data comprising information associated with position and velocity of the moving sub-network; and with the gNB of the cellular ground network, determining the estimated Doppler-shift component; and at least one of: compensating received signals based on the estimated Doppler shift component, and pre-compensating transmit signals based on the Doppler shift component prior to transmitting; wherein the compensating and/or pre-compensating is implemented by the cellular ground network.

In some embodiments, the method may further include: obtaining flight route data; and using the at least a portion of the navigation data and the flight route data, determining a subset of candidate cells from all cells of the cellular ground network for implementing cell acquisition, measurement and handover functions.

In some embodiments, the method may further include: with flight user equipment of the moving sub-network, receiving the navigation data from GNSS; receiving the flight route data; determining the subset of candidate cells based on the navigation data and the flight route data; determining a target cell for handover; and communicating a request for early handover preparation to the cellular ground network.

In some embodiments, the method may further include: with the cellular ground network, receiving the navigation data from flight user equipment of the moving sub-network; receiving the flight route data; determining the subset of candidate cells based on the navigation data and the flight route data; determining a target cell for handover; and preparing the cellular ground network for handover. The flight user equipment can be configured to communicate the navigation data to a serving gNB of the cellular ground network, and the serving gNB of the cellular ground network communicates with a target gNB of the target cell to effectuate the handover.

In some embodiments, the method may further include: determining an estimated timing advance (TA) parameter for a wireless signal based on the navigation data; and compensating a transmit signal based on the estimated TA parameter. The estimated TA parameter can be selected to be one that ensures a corresponding TA parameter issued by the cellular ground network is a positive value.

In some embodiments, the method may further include: obtaining flight route data; determining power control parameters for a wireless signal based on the navigation data and the flight route data; and transmitting a signal based on the power control parameters.

In some embodiments, the method may further include: with flight user equipment of the moving sub-network, estimating path loss to a servicing gNB of the cellular ground network based on the navigation data and flight route data, and updating open loop power control based on the estimated path loss.

In some embodiments, the method may further include: with a servicing gNB of the moving cellular ground network, estimating path loss to flight user equipment based on the navigation data and flight route data, and updating open loop power control based on the estimated path loss.

In some embodiments, the method may further include: if the flight user equipment transmits with higher power than the path loss requirement, then with the servicing gNB of the cellular ground network, scheduling less time or frequency resources to the flight user equipment for minimizing impact on system capacity.

In some embodiments, the method may further include: obtaining flight route data; determining beam parameters for a wireless signal based on the navigation data and the flight route data; and transmitting, receiving, or transmitting and receiving one or more wireless signals based on the determined beam parameters. Said transmitting, receiving, or transmitting and receiving one or more wireless signals based on the determined beam parameters can be implemented with the moving sub-network during initial access. Alternatively, said transmitting, receiving, or transmitting and receiving one or more wireless signals based on the determined beam parameters can be implemented with the moving sub-network in a connected state.

In other embodiments, the moving sub-network can be housed on a train, balloon, drone, or the like.

While various details, features, and combinations are described in the illustrated embodiments, one having skill in the art will appreciate a myriad of possible alternative combinations and arrangements of the features and details disclosed herein. As such, the descriptions are intended to be enabling only, and non-limiting. Instead, the spirit and scope of the invention is intended to be determined from the appended claims.

What is claimed is:

1. A method for providing wireless communication between a cellular ground network and a moving sub-network, the method comprising:
    obtaining navigation data from the global navigation satellite system (GNSS), said navigation data comprising information associated with at least one of: position, vector-direction and velocity of the moving sub-network;
    updating one or more parameters for signal transmission, reception or a combination thereof based on the navigation data;
    determining an estimated Doppler-shift component for a wireless signal based on the navigation data; and
    compensating a receive or transmit signal with the estimated Doppler-shift component; and
with flight user equipment of the moving sub-network,
    communicating at least a portion of the navigation data to a gNB of the cellular ground network, said at least a portion of the navigation data comprising information associated with position and velocity of the moving sub-network; and
with the gNB of the cellular ground network,
    determining the estimated Doppler-shift component; and
    at least one of:
    compensating received signals based on the estimated Doppler shift component, and
    pre-compensating transmitted signals based on the Doppler shift component prior to transmitting;
    wherein the compensating and/or pre-compensating is implemented by the cellular ground network; and
    wherein the moving sub-network is housed on an aircraft, train, balloon, or drone.

2. The method of claim 1, further comprising:
    determining an estimated timing advance (TA) parameter for a wireless signal based on the navigation data; and
    compensating a transmit signal based on the estimated TA parameter.

3. The method of claim 2, further comprising: wherein the estimated TA parameter is selected to be one that ensures a corresponding TA parameter issued by the cellular ground network is a positive value.

4. A method for providing wireless communication between a cellular ground network and a moving sub-network, the method comprising:
    obtaining navigation data from the global navigation satellite system (GNSS), said navigation data comprising information associated with at least one of: position, vector-direction and velocity of the moving sub-network;
    updating one or more parameters for signal transmission, reception or a combination thereof based on the navigation data;
    obtaining flight route data;
    using the at least a portion of the navigation data and the flight route data, determining a subset of candidate cells from all cells of the cellular ground network for implementing cell acquisition, measurement and handover functions; and
with flight user equipment of the moving sub-network,
    receiving the navigation data from GNSS;
    receiving the flight route data;
    determining the subset of candidate cells based on the navigation data and the flight route data;
    determining a target cell for handover; and
    communicating a request for early handover preparation to the cellular ground network;
wherein the moving sub-network is housed on an aircraft, train, balloon, or drone.

5. The method of claim 4, wherein the method further comprises:
    with the cellular ground network,
        receiving the navigation data from flight user equipment of the moving sub-network;
        receiving the flight route data;
        determining the subset of candidate cells based on the navigation data and the flight route data;
        determining a target cell for handover; and
        preparing the cellular ground network for handover.

6. The method of claim 5, wherein the flight user equipment communicates the navigation data to a serving gNB of the cellular ground network, and the serving gNB of the cellular ground network communicates with a target gNB of the target cell to effectuate the handover.

7. A method for providing wireless communication between a cellular ground network and a moving sub-network, the method comprising:
    obtaining navigation data from the global navigation satellite system (GNSS), said navigation data comprising information associated with at least one of: position, vector-direction and velocity of the moving sub-network;
    updating one or more parameters for signal transmission, reception or a combination thereof based on the navigation data;
    obtaining flight route data;
    determining power control parameters for a wireless signal based on the navigation data and the flight route data;
    transmitting a signal based on the power control parameters; and
with a servicing gNB of the cellular ground network or flight user equipment of the moving sub-network:
    estimating path loss to flight user equipment based on the navigation data and flight route data, and updating open loop power control based on the estimated path loss;
wherein:
if the flight user equipment transmits with higher power than the path loss requirement,
then with the servicing gNB of the cellular ground network:
   scheduling less time or frequency resources to the flight user equipment for minimizing impact on system capacity;
wherein the moving sub-network is housed on an aircraft, train, balloon, or drone.

8. A method for providing wireless communication between a cellular ground network and a moving sub-network, the method comprising:
   obtaining navigation data from the global navigation satellite system (GNSS), said navigation data comprising information associated with at least one of: position, vector-direction and velocity of the moving sub-network;
   updating one or more parameters for signal transmission, reception or a combination thereof based on the navigation data;
   obtaining flight route data;
   determining beam parameters for a wireless signal based on the navigation data and the flight route data; and
   transmitting, receiving, or transmitting and receiving one or more wireless signals based on the determined beam parameters, wherein said transmitting, receiving, or transmitting and receiving one or more wireless signals based on the determined beam parameters is implemented with the moving sub-network during initial access;
further comprising:
with user equipment of the moving sub-network:
   transmitting user identification data to the cellular ground network during said initial access, said transmitting being achieved with the determined beam parameters, and
with a gNB of the cellular ground network:
   receiving the user identification data,
   determining corresponding beam parameters based on the user identification data received from the user equipment, and
   subsequently returning a signal or message using the corresponding beam parameters;
wherein the moving sub-network is housed on an aircraft, train, balloon, or drone.

9. The method of claim 8, wherein said transmitting, receiving, or transmitting and receiving one or more wireless signals based on the determined beam parameters is implemented with the moving sub-network in a connected state.

* * * * *